US005822283A

United States Patent [19]

Bos et al.

[11] Patent Number: 5,822,283

[45] Date of Patent: Oct. 13, 1998

[54] METHOD FOR ENHANCING DATA ACCESS OF CD-ROM CHANGER

[75] Inventors: Eric Rene Bos, Fountain Valley; Robert L. Montelius, Jr., Laguna Hills, both of Calif.

[73] Assignee: MultiDisc Technologies, Newbury Park, Calif.

[21] Appl. No.: 791,072

[22] Filed: Jan. 29, 1997

[51] Int. Cl.[6] .......... G11B 17/22

[52] U.S. Cl. .......... 369/30; 369/34

[58] Field of Search .......... 369/30, 34, 33, 369/36, 37, 38, 39, 178

[56] References Cited

U.S. PATENT DOCUMENTS

| | | | |
|---|---|---|---|
| 4,527,262 | 7/1985 | Manto | 369/33 |
| 4,614,474 | 9/1986 | Sudo | 414/281 |
| 4,734,814 | 3/1988 | Fujino et al. | 360/133 |
| 4,855,980 | 8/1989 | Hug et al. | 369/36 |
| 5,020,043 | 5/1991 | Kohler | 369/36 |
| 5,022,019 | 6/1991 | Motoyoshi et al. | 369/36 |
| 5,036,503 | 7/1991 | Tomita | 369/36 |
| 5,041,929 | 8/1991 | Fryberger et al. | 360/92 |
| 5,146,451 | 9/1992 | Kang | 369/270 |
| 5,157,646 | 10/1992 | Amemiya et al. | 369/36 |
| 5,189,656 | 2/1993 | Masaki et al. | 369/47 |
| 5,195,066 | 3/1993 | Amemiya et al. | 369/32 |
| 5,197,056 | 3/1993 | Van Heusden et al. | 369/37 |
| 5,206,845 | 4/1993 | Baxter et al. | 369/34 |
| 5,210,728 | 5/1993 | Noguchi et al. | 369/36 |
| 5,214,628 | 5/1993 | Langman et al. | 369/37 |
| 5,216,645 | 6/1993 | Sakayama | 369/36 |
| 5,228,016 | 7/1993 | Menke | 369/36 |
| 5,235,579 | 8/1993 | Ross | 369/37 |
| 5,247,500 | 9/1993 | Miyoshi et al. | 369/38 |
| 5,255,251 | 10/1993 | Fitzgerald et al. | 369/36 |
| 5,263,010 | 11/1993 | Amemiya et al. | 369/32 |
| 5,267,225 | 11/1993 | Fukasawa et al. | 369/36 |
| 5,285,333 | 2/1994 | Barr et al. | 360/92 |
| 5,289,441 | 2/1994 | Domberg et al. | 369/34 |
| 5,327,412 | 7/1994 | Lee | 369/75.2 |
| 5,373,489 | 12/1994 | Sato et al. | 369/36 |
| 5,446,714 | 8/1995 | Yoshio et al. | 369/34 |
| 5,473,585 | 12/1995 | Kim | 369/36 |

FOREIGN PATENT DOCUMENTS

| | | |
|---|---|---|
| 542482 | 5/1993 | European Pat. Off. . |
| 589479A2 | 3/1994 | European Pat. Off. . |
| 4341968 | 11/1992 | Japan . |
| 68465 | 3/1994 | Japan . |
| 6195838 | 7/1994 | Japan . |

*Primary Examiner*—Tan Xuan Dinh

*Attorney, Agent, or Firm*—Stetina Brunda Garred & Brucker

[57] ABSTRACT

A method for enhancing access to desired data stored upon CD-ROM's and the like pre-positions optics of a CD-ROM reader to a position such that the optics will be proximate a lead-in position for the desired data stored upon the selected CD-ROM after the selected CD-ROM is loaded into the CD-ROM reader. The pre-positioning is performed prior to the selected CD-ROM being loaded into the CD-ROM reader. After the selected CD-ROM is loaded into the CD-ROM reader, the optics of the CD-ROM reader are positioned to the lead-in position for the desired data block and data is read from the selected CD-ROM.

3 Claims, 4 Drawing Sheets

```
┌─────────────────────────────────────────────────────┐
│ THE HOST COMMANDS THE CHANGER SYSTEM TO MOVE        │
│ THE REQUESTED DISC FROM ITS ASSIGNED AUTOCHANGER    │
│ INTERNAL DISC MAGAZINE STORAGE LOCATION TO THE      │
│ OPTICS MECHANISM. WHILE THE DISC MOVE IS IN         │─50
│ PROGRESS, THE HOST COPIES THE ASSOCIATED TOC        │
│ DATA FROM SECONDARY STORAGE TO THE ALLOCATED        │
│ TOC BUFFER IN PROCESSOR MAIN MEMORY.                │
└─────────────────────────────────────────────────────┘
                          ↓
┌─────────────────────────────────────────────────────┐
│ THE HOST REFERENCES THIS BUFFERED (TOC) DATA        │
│ TO CALCULATE/DETERMINE THE ACTUAL PHYSICAL CD-      │─52
│ ROM ADDRESS(ES) OF ALL REQUESTED DATA BLOCKS.       │
└─────────────────────────────────────────────────────┘
                          ↓
┌─────────────────────────────────────────────────────┐
│ WITH THE DISC "MOVING TO OPTICS" IN PROGRESS,       │
│ THE HOST COMMANDS THE PRE-POSITIONING OF OPTICAL    │
│ READER MECHANISM TO THE "COARSE TUNE" LEAD-IN       │─54
│ POSITION BASED ON ESTIMATED TIME REMAINING UNTIL    │
│ OPTICS MECHANISM ENGAGES THE LOADING DISC.          │
└─────────────────────────────────────────────────────┘
                          ↓
┌─────────────────────────────────────────────────────┐
│ THE HOST REQUESTS TRANSFER OF DATA. THIS            │
│ CAUSES THE CD-ROM DRIVE ELECTRONICS TO "FINE TUNE"  │
│ POSITION THE OPTICAL READER MECHANISM AT THE        │─56
│ LEAD-IN TO THE REQUESTED DATA BLOCK.                │
└─────────────────────────────────────────────────────┘
                          ↓
┌─────────────────────────────────────────────────────┐
│ THE HOST TRANSFERS THE REQUESTED DATA               │
│ BLOCK BETWEEN DISC AND A TEMPORARY BUFFER           │─58
│ AREA OF PROCESSOR MAIN MEMORY.                      │
└─────────────────────────────────────────────────────┘
                          ↓
┌─────────────────────────────────────────────────────┐
│ THIS ENTIRE PROCESS (OR A SUBSET OR                 │
│ VARIATION OF THE PROCESS) IS REPEATED               │─60
│ AS OFTEN AS REQUESTED BY THE HOST.                  │
└─────────────────────────────────────────────────────┘
                          ↓
┌─────────────────────────────────────────────────────┐
│ WHEN THE HOST DETERMINES (THROUGH USER              │
│ COMMAND) THAT THE DISC IS TO BE RETURNED            │
│ TO ITS ASSIGNED MAGAZINE STORAGE LOCATION,          │
│ THE HOST COMMANDS THE CHANGER SYSTEM TO             │─62
│ MOVE THE DISC FROM THE OPTICS MECHANISM TO          │
│ THE ASSIGNED DISC MAGAZINE STORAGE LOCATION         │
│ WHERE IT REMAINS UNTIL ITS NEXT RETRIEVAL.          │
└─────────────────────────────────────────────────────┘
```

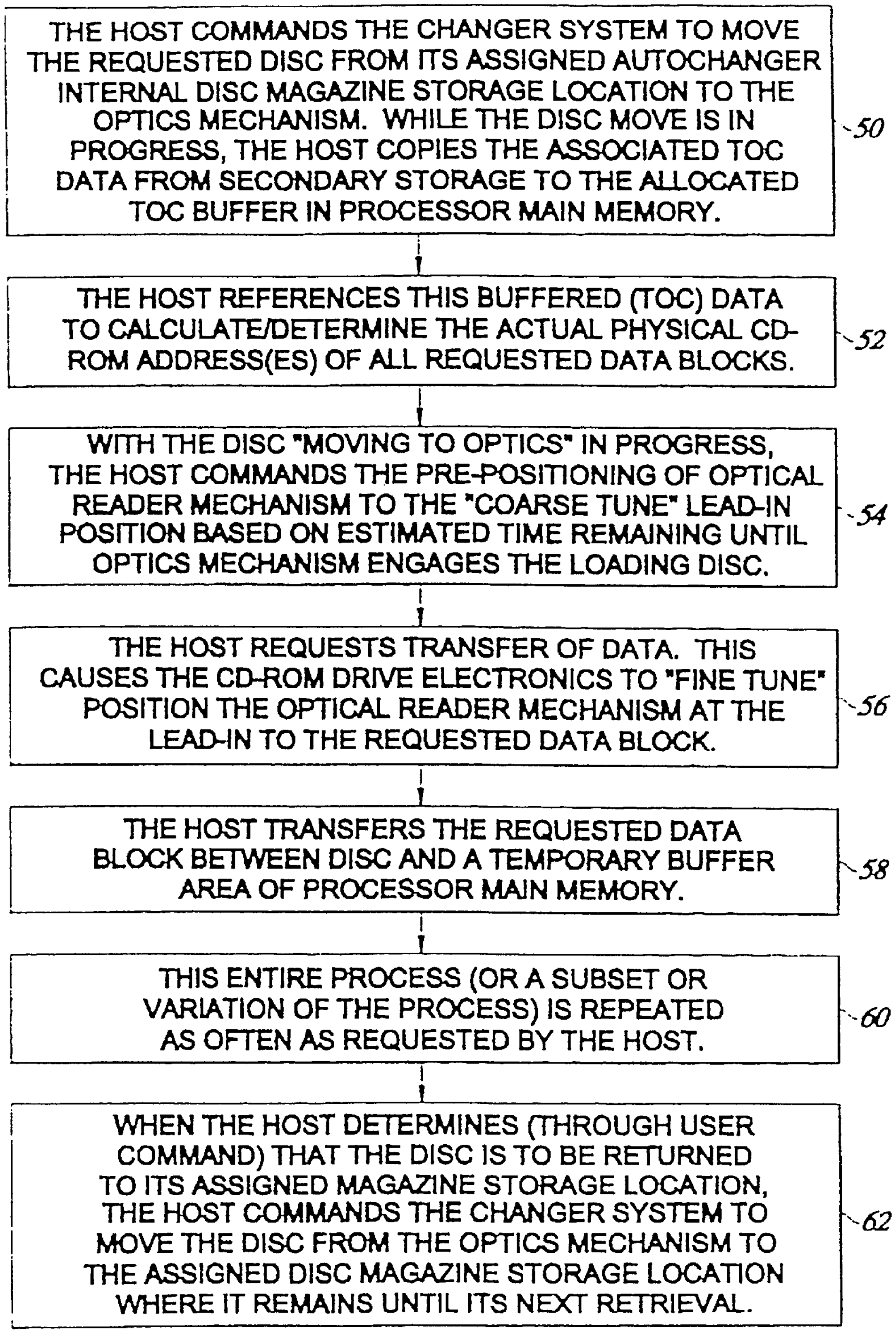

*Fig. 2*

METHOD FOR ENHANCING DATA ACCESS OF CD-ROM CHANGER

FIELD OF THE INVENTION

The present invention relates generally to storage/autochanger systems for electronic media such as CD-ROM's and the like. The present invention relates more particularly to a method for enhancing access to data stored upon CD-ROM's and the like by pre-positioning the optics of a CD-ROM reader prior to the CD-ROM being loaded into the reader, so as to substantially reduce the time required to read desired data from the CD-ROM.

BACKGROUND OF THE INVENTION

Compact Discs for storing audio, i.e., music, speech, etc., are well known. Compact discs (commonly referred to as CD-ROM's) for storing and retrieving data, text, images, music, etc., are likewise well known. As such, discs are used to store and retrieve a wide variety of data types. Such discs provide a very high density storage media, and are thus desirable for storing large volumes of such data.

Storage/autochanger systems, i.e., jukeboxes, for facilitating selection of a desired one of a plurality of different recording media are also well known. For example, such storage/autochanger systems are commonly used to facilitate the selection of desired audio recordings.

More particularly, storage/autochanger systems for facilitating the selection of both CD's having audio data stored thereon and CD-ROM's having data stored thereon are known. Such disc jukeboxes commonly contain approximately 50 to 100 discs.

Contemporary storage/autochanger systems have proven generally suitable for their intended uses. However, as those skilled in the art will appreciate, such contemporary storage/autochanger systems suffer from inherent deficiencies which detract from their overall usefulness. For example, in audio CD and CD-ROM storage/autochanger systems, each time that a particular audio CD or CD-ROM is selected and loaded into the reader, the reader optics (optical reader mechanism), which move along the surface of the disc to perform the reading of data therefrom, must be positioned to the lead-in for the data block to be read. As those skilled in the art will appreciate, such positioning of the reader optics to the lead-in for the data block to be read requires a substantial amount of time, and consequently slows access to the desired data substantially. Thus, it is desirable to minimize or eliminate the time required to move the reader optics to the lead-in for the desired data block, thereby substantially reducing the total time required to access data stored upon the CD-ROM.

As such, it would be desirable to provide a procedure for enhancing access to data stored upon audio tracks of CD's and/or data blocks of CD-ROM's and the like by pre-positioning the optics of the disc reader to a position proximate the lead-in to the data block to be read prior to loading the disc into the disc reader, thereby reducing the time required to access such data.

SUMMARY OF THE INVENTION

The present invention specifically addresses and alleviates the above-mentioned deficiencies associated with the prior art. More particularly, the present invention comprises a method for enhancing access to data stored upon CD-ROM's and the like. Such CD-ROM's and the like are typically stored in a magazine or similar storage device. The methodology of the present invention comprises pre-positioning the optics of the disc reader to a position proximate, i.e., as close as possible to, the lead-in to the data block to be read prior to completion of the process of loading the disc into the reader, thereby eliminating the need to take time to so position the CD-ROM reader optics subsequent to such loading, and consequently thereby reducing the time to access data stored upon the disc correspondingly.

As used herein, the term CD-ROM is defined to include all CD, CD-ROM's and DVD's (digital versatile devices), as well as similar storage media for audio, data, etc. Further, as used herein, the term magazine is defined to include any system for storing a plurality of CD-ROM's or the like, including shelves, racks, stacking arrangements, etc. Yet further, as used herein, the term data block is defined to include audio tracks and any other addressable quantities of data stored upon a CD-ROM or the like.

As used herein, the term CD-ROM reader shall be defined to include any device capable of reading data, music, etc., from a CD or CD-ROM or like device, including but not limited to CD-ROM reader/writers.

Thus, as those skilled in the art will appreciate, when table of contents caching is utilized, i.e., the table of contents for the selected disc is pre-stored upon a nonvolatile storage device and is readily accessible to the host, then the host has all of the information necessary to move or pre-position the CD-ROM reader optics to a position proximate where the lead-in to the desired data block will be after the CD-ROM has been loaded into the CD-ROM reader. This course alignment of the CD-ROM reader optics is performed while the selected CD-ROM is being transported from its storage location to the CD-ROM reader, thus eliminating the need to perform such movement of the CD-ROM reader optics after the selected CD-ROM has been loaded. As those skilled in the art will appreciate, such pre-positioning of the CD-ROM reader optics substantially reduces the amount of time required to read the desired data block.

More particularly, the method of the present invention comprises the steps of pre-positioning optics of a CD-ROM reader to a position such that the optics will be proximate a lead-in position for the desired data stored upon the selected CD-ROM after the selected CD-ROM is loaded into the CD-ROM reader. The pre-positioning is performed prior to the selected CD-ROM being loaded into the CD-ROM reader. After such pre-positioning, the selected CD-ROM is loaded into the CD-ROM reader. Next, the optics of the CD-ROM reader are positioned more accurately to the lead-in position for the desired data block and the desired data is read from the selected CD-ROM.

Thus, the CD-ROM reader optics is course positioned prior to loading of the CD-ROM into the CD-ROM reader, i.e., while the CD-ROM is being transferred from its storage location to the CD-ROM reader. Since such course positioning is performed prior to loading of the CD-ROM into the CD-ROM reader, the optics can only be positioned such that they are located approximately at the lead-in position to the desired data block. The CD-ROM must be present to obtain precise positioning of the reader optics. After the CD-ROM is loaded into the CD-ROM reader, then the CD-ROM optics are moved so as to fine tune their positioning at the lead-in to the desired data block and the desired data then is read from the CD-ROM. This is only necessary if the position of the CD-ROM optics is not within the appropriate range of the desired data lead-in position. Thus, such fine tuning is only performed when necessary.

According to the preferred embodiment of the present invention, the step of pre-positioning the optics of the CD-ROM reader comprises utilizing a pre-stored table of contents for the selected CD-ROM, so as to facilitate such pre-positioning of the optics of the CD-ROM reader. That is, a table of contents which is stored, preferably upon a non-volatile storage device, is copied therefrom to an allocated table of contents buffer in processor main memory. This table of contents is utilized to determine the position of the lead-in for the desired data block. The CD-ROM optics are then moved to the lead-in position determined by the table of contents, or at least as close thereto as can be performed without the CD-ROM being installed in the CD-ROM reader.

The estimated time until disc load can, optionally, be used by the host or other control element to determine the 'drop dead' time at which it is necessary to issue the pre-positioning command to the drive without suffering any loss of benefit associated with the pre-positioning capability.

Thus, according to the methodology of the present invention, a CD-ROM changer is commanded, typically via a host, typically a dedicated microprocessor, to move a selected CD-ROM from an assigned storage location to a CD-ROM reader. As the CD-ROM is being moved from the storage location to the CD-ROM reader, the table of contents for the selected CD-ROM is communicated from a non-volatile storage device to an allocated table of contents buffer in processor main memory. That table of contents is then utilized to determine the physical address for the desired data stored upon the CD-ROM. With this information, the drive optics are pre-positioned to the expected gross or rough lead-in position and there wait for the disc load to complete.

Thus, according to the methodology of the present invention, means for enhancing access to data stored upon CD-ROM's, by decreasing the time required to read such data, are provided.

BRIEF DESCRIPTION OF THE DRAWINGS

FIG. 2 is a flow chart showing the methodology for accessing data on a CD-ROM according to the present invention;

DETAILED DESCRIPTION OF THE PREFERRED EMBODIMENT

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The method for enhancing access to desired data stored upon CD-ROM's and the like is illustrated in FIGS. 2 and

Figure 1:
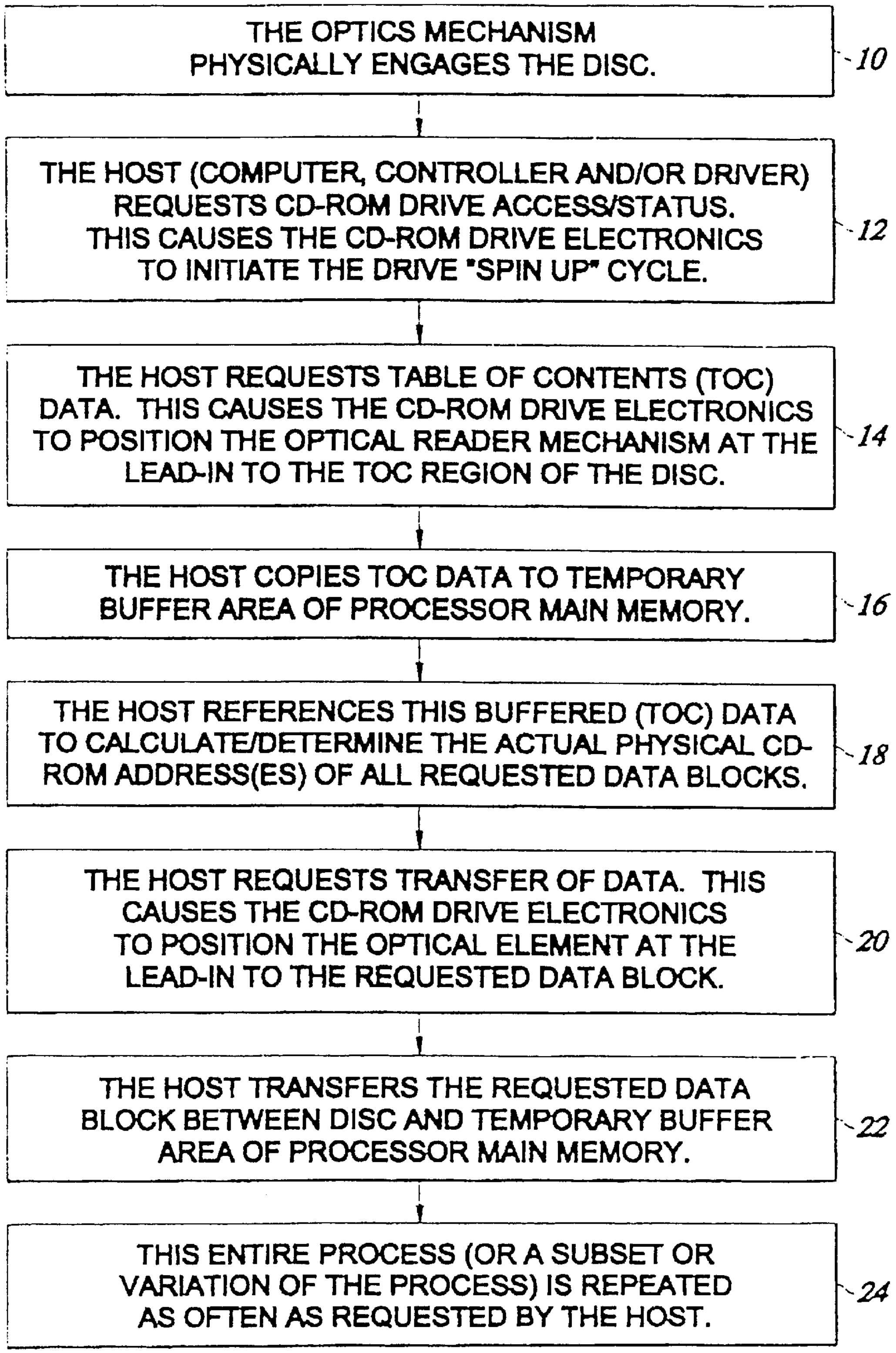
FIG. 1 is a flow chart showing the methodology for accessing data on a CD-ROM according to contemporary methodology.
Figure 3:
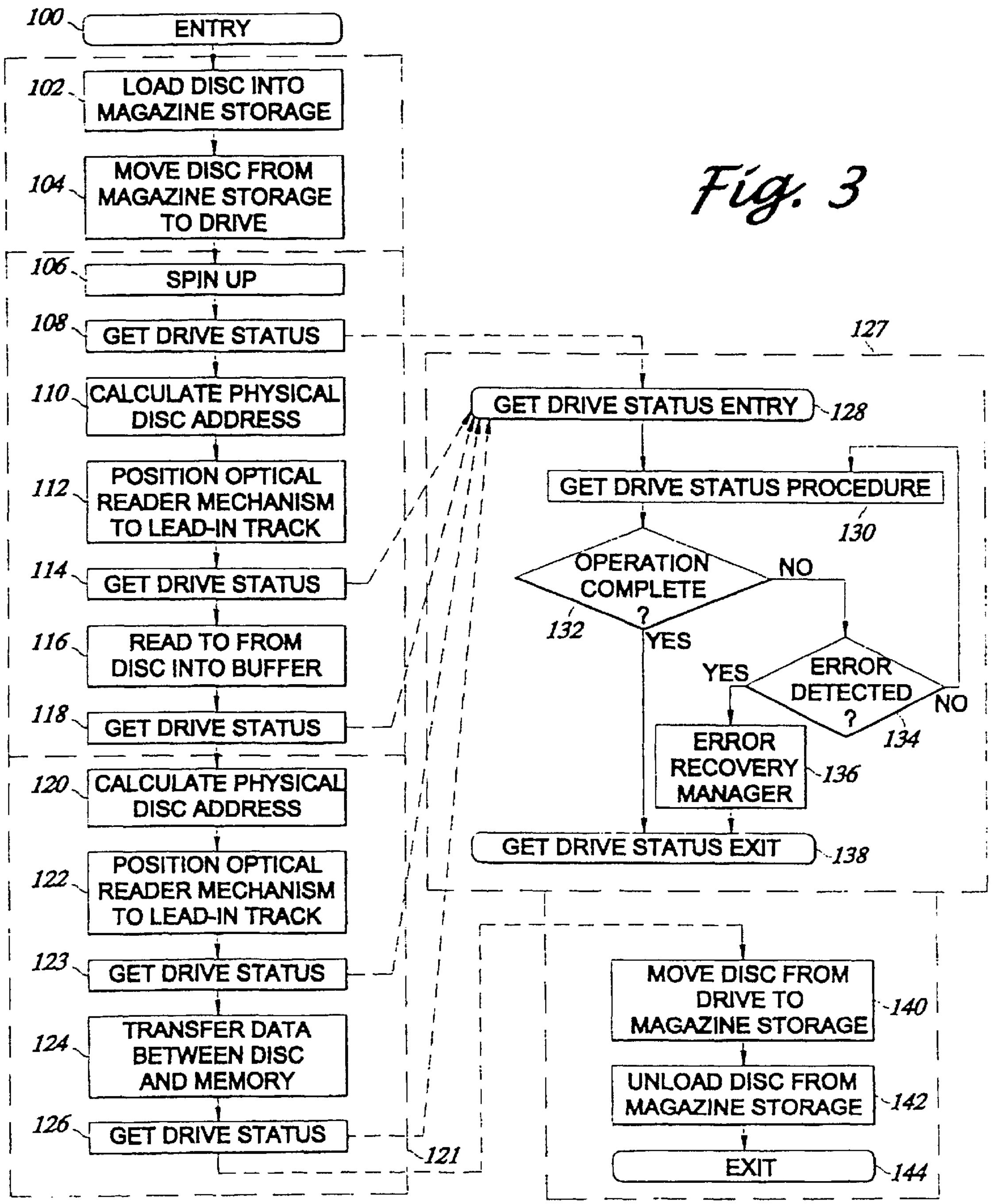
FIG. 3 is a flow chart showing CD-ROM data access according to contemporary methodology in further detail.

4. FIGS. 1 and 3 depict prior art methodology for accessing data upon a CD-ROM.

Referring now to FIG. 1, according to prior art methodology, first the optics mechanism physically engages 10 the disc. Next, the host request CD-ROM drive access/status, thereby causing the CD-ROM drive electronics to initiate 12 the drive spin up cycle. As those skilled in the art will appreciate, the host may comprise a computer, controller, driver, or similar device.

Next, the host requests 14 table of contents data. This causes the CD-ROM drive electronics to position the reader optics at the lead-in to the table of contents region of the disc. Table of contents data is needed by the host in order to determine the actual physical address of the requested blocks of data.

Next, the host copies 16 the table of contents data to a temporary buffer area of the processor main memory. The host then references 18 this buffered table of contents data in order to calculate or determine the actual physical CD-ROM addresses for all of the requested data blocks. This allows the host to request 20 transfer of data, as desired. Such transfer of data requires that the CD-ROM drive electronics position the optics of the CD-ROM reader at the a lead-in to the requested data block. Once the optics has been positioned to the lead-in to the requested data block, then the host transfers 22 the requested data block between the disc and a temporary buffer area of the processor main memory. This process is repeated 24, as required by the host.

As those skilled in the art will appreciate, a finite and undesirable amount of time is required to position the reader optics at the lead-in to the data block where desired information is located. It is the goal of the present invention to minimize the time required to access desired data upon the CD-ROM. This is accomplished by pre-positioning the CD-ROM reader optics as close as possible to that position where the lead-in to the desired data block is expected to be located once the CD-ROM is loaded. This is accomplished by utilizing data from a pre-stored table of contents to effect course positioning of the CD-ROM reader optics, as discussed in detail below.

Referring now to FIG. 2, according to the preferred embodiment of the present invention, the table of contents for the CD-ROM upon which desired data is located is prestored, preferably upon a non-volatile storage device.

Thus, the present invention preferably comprises a disc storage container or magazine which holds a plurality of CD-ROM's, the tables of contents of each of which has previously been so stored, so as to facilitate quick retrieval thereof, thus permitting the pre-positioning of the CD-ROM reader optics according to the methodology of the present invention.

Thus, according to the present invention, one stored table of contents is associated with each CD-ROM located in a physical storage location, so as to facilitate matching of the CD-ROM and its associated table of contents. As such, each CD-ROM is preferably loaded and registered into the disc storage/autochanger system prior to first accessing data stored thereupon. During this loading and registering process, the table of contents is accessed and transferred to the host allocated buffer memory, from which it is copied to permanent storage in the host secondary storage system, preferably a hard disk or other non-volatile storage device. Information necessary to facilitate retrieval of a CD-ROM's table of contents is preferably stored upon the same non-volatile storage device as the table of contents is stored and facilitates indexing of the database of CD-ROM tables of contents.

According to the present invention, when a CD-ROM is requested by the host, transporting of the disc from its storage location to the CD-ROM reader and pre-positioning of the CD-ROM optics occur simultaneously. This is accomplished by communicating the table of contents from the non-volatile storage device to a main memory allocated buffer such that the table of contents is accessible prior to physical loading of the CD-ROM into the CD-ROM reader.

Thus, as the CD-ROM is being transferred from its storage location to the CD-ROM reader, either the host or the CD-ROM reader itself effects pre-positioning of the CD-ROM reader optics to a position proximate to the position to be occupied by the lead-in to the desired data block, once the CD-ROM has been loaded into the CD-ROM reader.

After the selected CD-ROM has been loaded into the CD-ROM reader, the CD-ROM reader optics are then fine positioned so as to position them at the lead-in for the desired data block and the requested data is then transferred to the host.

As those skilled in the art will appreciate, this procedure substantially reduces the time required to access data stored upon the selected CD-ROM, since a portion of the process of positioning the CD-ROM optics is performed prior to loading the CD-ROM in the CD-ROM reader.

More particularly, the method for enhancing access to desired data stored upon CD-ROM's and the like of the present invention comprises the steps of the host, i.e., a computer, microprocessor, etc., commanding 50 the changer to move the requested disc from its assigned autochanger internal disc magazine storage location to the optics mechanism of the CD-ROM reader. As the disc is being moved from its storage location to the CD-ROM reader, the host copies the associated table of contents data from the secondary storage, i.e., the hard disk or other non-volatile storage device to the allocated table of contents buffer in processor main memory.

The host then references 52 the buffered table of contents data to calculate or determine the actual physical CD-ROM address or addresses of all requested data blocks.

With the disc "moving to optics" in progress, the host commands 54 the pre-positioning of the CD-ROM reader optics to the course lead-in position based upon the estimated time remaining until the optics mechanism engages the loading disc. As discussed above, the estimated time remaining until the optics mechanism engages the loading disc may be used to determine the 'drop dead' time at which it is necessary to issue the pre-positioning command, if desired.

Next, the host requests 56 the transfer of data from the CD-ROM. This causes the CD-ROM drive electronics to fine tune the positioning of the optics at the lead-in position to the requested data block. The host then transfers 58 the requested data block between the CD-ROM disc and a temporary buffer area of processor main memory.

The entire process (or a subset or variation of the process) is repeated 60, as often as requested by the host.

When the host determines 62 (through user command) that the disc is to be returned to its assigned magazine storage location, the host commands the changer system to move the disc from the optics mechanism of the CD-ROM reader to the assigned disc magazine storage location, where it remains until its next retrieval.

Referring now to FIG. 3, a more detailed description of the prior art methodology for facilitating CD-ROM data access is provided.

After entering 100 the process, the prior art methodology generally comprises robotics operation 101 which facilitates the adding of discs to the system and/or moving discs from the magazine storage to the system drives. It also generally comprises drive initialization and table of contents retrieval 103 into table of contents buffer. According to contemporary methodology, each time that a disc is loaded into or engaged by the drive optics mechanism, the drive goes through its initialization procedure and must locate and read the table of contents into a temporary buffer. This introduces the table of contents access latency described above.

Disc data access and transfers initiated by the host in response to user request 121 occur after the table of contents has been read into the buffer. The table of contents thus can be accessed by the host in response to each user request. This process is repeated as often as required until the disc is disengaged and/or removed from the drive optics mechanism.

According to contemporary methodology, after entering 100 the process, the disc is loaded 102 into the magazine storage/autochanger system. In order to access data stored upon the disc, the disc is moved 104 from the storage magazine to the CD-ROM reader or drive.

Further regarding the drive initialization and table of contents retrieval 103, the disc must first be spun up 106. Then, the drive status is accessed 108 and the physical disc address is calculated 110 or determined, so as to facilitate the reading of data therefrom.

Next, the optics are positioned 112 to the lead-in track of the table of contents to be read. The drive status is again queried 114. Then, the table of contents is read 116 from disc into buffer. Next, the drive status is again queried 118.

Further regarding the disc access and transfers 121 which are initiated by the host in response to user requests, the physical disc address for such data transfer is obtained 120. Next, the optics are positioned 122 to the lead-in track of the data block. The drive status is queried 123 and the transfer 124 of data between the disc and memory is commenced. The drive status is again queried 126.

Each time the drive status is queried as in the GET DRIVE STATUS calls 108, 114, 118, 123, and 126, the GET DRIVE STATUS ENTRY 128 control entry point is taken and the GET DRIVE STATUS PROCEDURE or system call is invoked thereby 130. Next, if the operation (for which status is being checked) is complete 132, the GET DRIVE STATUS EXIT 138 control exit point is taken, and execution control is returned back to the calling function. Otherwise, a check is made for errors 134. If no errors are detected then the get drive status 130 is repeated. If an error is detected, then error recovery 136 commences. The GET DRIVE STATUS EXIT 138 returns control to the step following the GET DRIVE STATUS call 108, 114, 118, 123, or 126 which initiated the GET DRIVE STATUS ENTRY 128. Thus, the drive status procedure 127, comprising steps 128–138 is a procedure or subroutine which is called (i.e., to which control of execution is transferred) by the GET DRIVE STATUS calls 108, 114, 118, 123, and 126.

At the appropriate host determined point in time, subsequent to the completion of data access, the disc is moved to storage magazine 140 and optionally, this or another disc is unloaded from the magazine storage/autochanger system 142, prior to exiting 144.

Thus, according to prior art methodology, each time that a disc is loaded into the CD-ROM reader, the drive goes through an initialization procedure which includes locating and reading the table of contents into a temporary buffer.

Further, with each positioning request, as when data upon a different block is requested, the user must wait until the CD-ROM reader optics are positioned to the lead-in track for header search and data transfer activities to commence. The time required to position the optics to the lead in track of the desired data block is substantial.

Figure 4:
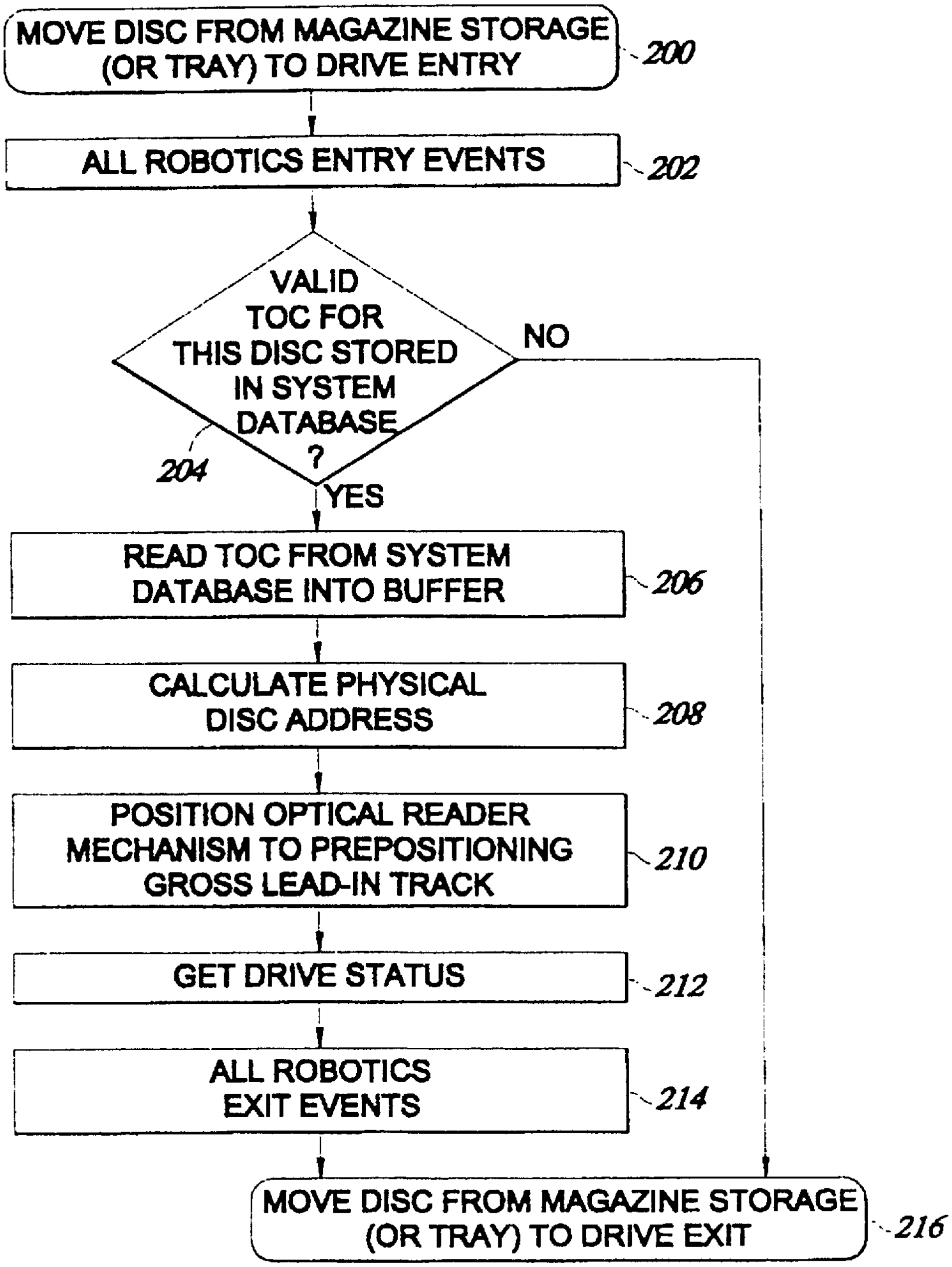
FIG. 4 is a flow chart showing CD-ROM data access according to the present invention in further detail.

Referring now to FIG. 4, the method of enhancing access to desired data stored upon CD-ROM's and the like, according to the present invention, is described in further detail.

First, a selected disc is moved 200 from its magazine storage location or tray to the entry to the CD-ROM reader.

During the physical movement of the CD-ROM to the optics mechanism of the CD-ROM reader, the table of contents is provided to the host, typically from a table of contents database system for all of the discs contained within the magazine storage.

All robotics entry events 202 are performed so as to effect movement of the CD-ROM from its magazine storage location to the CD-ROM reader.

As the CD-ROM is being transferred from its magazine storage location to the CD-ROM reader, the table of contents is read from the database and validated. If 204 not found to be valid, then the typical prior art method of reading a table of contents into the buffer must be employed, and optionally the table of contents is then stored for future reference. Steps 200 and 216 represent the "control" entry and exit points of the "move disc" procedure, respectively. If 204 the table of contents is found to be valid, then the table of contents is read 206 from the system database into a temporary main memory allocated buffer.

Next, the physical disc address of the desired data block is determined or calculated 208.

Next, the CD-ROM reader optics is positioned 210 to a pre-positioning gross lead-in track, wherein the optics are located as close as the system can position them proximate to where the lead-in track of the desired data block is expected to be after the CD-ROM has been loaded.

Next, the drive status is checked 212.

After completion of the pre-positioning process, then all robotics exit events are performed 214 and the procedure is complete.

Thus, according to the methodology of the present invention, pre-positioning of the reader optics can be viewed as two separate events. First, if it is determined that pre-positioning can be utilized, i.e., a stored table of contents has been located and copied to a temporary memory location, then the reader optics are pre-positioned to the expected gross or rough lead-in position immediately or optionally, deferred according to the discussion on 'estimated time until disc load' above. Thereafter, the CD-ROM reader optics do not move until the disc is loaded. Once the optics have engaged the disc, the disc spins up and the optics focus and read the first available header information to determine their actual current position. Using the actual current position of the optics, the system then determines what additional positioning, if any, must be performed in order to fine tune or more precisely position to the lead-in for the desired data stored upon the disc.

It is understood that the exemplary method for enhancing access to desired data stored upon CD-ROM's and the like described herein and shown in the drawings represents only a presently preferred embodiment(s) of the invention.

Indeed, various modifications and additions may be made to such embodiment(s) without departing from the spirit and scope of the invention. For example, the present invention may be configured to facilitate use with various different types of media, including but not limited to magnetic tape, magnetic disks, holographic storage media, etc.

Thus, these and other modifications and additions may be obvious to those skilled in the art and may be implemented to adapt the present invention for use in a variety of different applications.

What is claimed is:

1. A method for enhancing access to desired data stored upon a CD-ROM, the method comprising the steps of:

a) pre-positioning an optical reader mechanism of a CD-ROM reader to a position such that the mechanism will be proximate a lead-in position for desired data stored upon a selected CD-ROM after the selected CD-ROM is loaded into the CD-ROM reader, the pre-positioning being performed substantially prior to the selected CD-ROM being loaded into the CD-ROM reader, said pre-positioning determined in accord with a pre-stored table of contents of the selected CD-ROM;

b) loading the selected CD-ROM into the CD-ROM reader;

c) positioning the optical reader mechanism of the CD-ROM reader to the lead-in position for a desired data block; and d) reading the desired data from the CD-ROM.

2. The method as recited in claim 1 wherein the step of utilizing a pre-stored table of contents for the selected CD-ROM comprises loading the pre-stored table of contents from a non-volatile storage device to an allocated table of contents buffer in processor main memory.

3. A method for enhancing access to desired data stored upon a CD-ROM, the method comprising the steps of:

a) commanding a CD-ROM changer to move a selected CD-ROM from an assigned storage location to a CD-ROM reader;

b) communicating a table of contents for the selected CD-ROM from a non-volatile storage device to an allocated table of contents buffer in processor main memory prior to the CD-ROM being loaded in the CD-ROM reader;

c) using the table of contents to determine an address of desired data stored upon the CD-ROM;

d) pre-positioning an optical reader mechanism of the CD-ROM reader to a position such that the mechanism will be proximate a lead-in position for the desired data stored upon the selected CD-ROM after the selected CD-ROM is loaded into the CD-ROM reader, the pre-positioning being substantially performed prior to the selected CD-ROM being loaded into the CD-ROM reader and determined in accord with the table of contents communicated for the selected CD-ROM;

e) loading the selected CD-ROM into the CD-ROM reader;

f) positioning the optics of the CD-ROM reader to the lead-in position for the desired data block; and g) reading the desired data from the selected CD-ROM.

* * * * *